US006672347B2

(12) United States Patent
Tingstad

(10) Patent No.: US 6,672,347 B2
(45) Date of Patent: Jan. 6, 2004

(54) AERIAL TREE DELIMBING APPARATUS

(76) Inventor: Ervin Ralph Tingstad, 6757 Thorne Road, Peachland British Columbia (CA), V0H 1X9

( * ) Notice: Subject to any disclaimer, the term of this patent is extended or adjusted under 35 U.S.C. 154(b) by 0 days.

(21) Appl. No.: 10/368,570

(22) Filed: Feb. 20, 2003

(65) Prior Publication Data
US 2003/0159757 A1 Aug. 28, 2003

Related U.S. Application Data
(60) Provisional application No. 60/359,877, filed on Feb. 28, 2002.

(51) Int. Cl.[7] ............................................ A01G 23/095
(52) U.S. Cl. ................. 144/24.13; 47/1.01 R; 144/343; 244/118.1
(58) Field of Search ...................... 30/379.5; 47/1.01 R; 56/8, 235, 236, 15.1; 144/4.1, 24.13, 343, 335

(56) References Cited
U.S. PATENT DOCUMENTS

| 2,707,007 A | * | 4/1955 | Shuff ...................... 144/24.13 |
| 2,707,008 A | | 4/1955 | Bannister |
| 3,576,203 A | * | 4/1971 | Cote ...................... 144/24.13 |
| 4,662,414 A | | 5/1987 | Fandrich |
| 4,815,263 A | * | 3/1989 | Hartung et al. ................ 56/235 |
| 5,305,972 A | | 4/1994 | Hancocks |
| 5,961,070 A | * | 10/1999 | Bradford et al. .......... 244/118.1 |
| 6,263,932 B1 | * | 7/2001 | Chalifoux ................. 144/24.13 |
| 6,474,377 B1 | * | 11/2002 | Van De Mortel ........ 144/24.13 |

* cited by examiner

Primary Examiner—W. Donald Bray
(74) Attorney, Agent, or Firm—Antony C. Edwards

(57) ABSTRACT

A tree delimber includes a hollow tube having opposite upper and lower ends, the upper end adapted for mounted below an aerial hoist, the lower end having an anti-rotation device mounted thereto for coupling with, mating into and temporarily entangling with the branches of a tree as the trunk of the tree is journalled upwardly through the hollow tube as the tube is lowered onto the tree and down the trunk of the tree. The anti-rotation device inhibits rotation of the tube about a longitudinal axis of symmetry of the tube. A collar is rotatably mounted to the lower end of the tube. An annular saw blade having a lower cutting edge is mounted to the collar so as to dispose the cutting edge downwardly. The cutting edge of the saw rotates in a circle contained in a plane generally perpendicular to the axis of symmetry of the tube. A prime mover is mounted to the tube. The prime mover is remotely actuable by an operator and cooperates with the collar so that, once actuated, the prime mover urges the collar to rotate about the axis of symmetry of the tube while the tube is held substantially stationary relative to the trunk of a tree by the anti-rotation device engaging the branches of the tree.

16 Claims, 4 Drawing Sheets

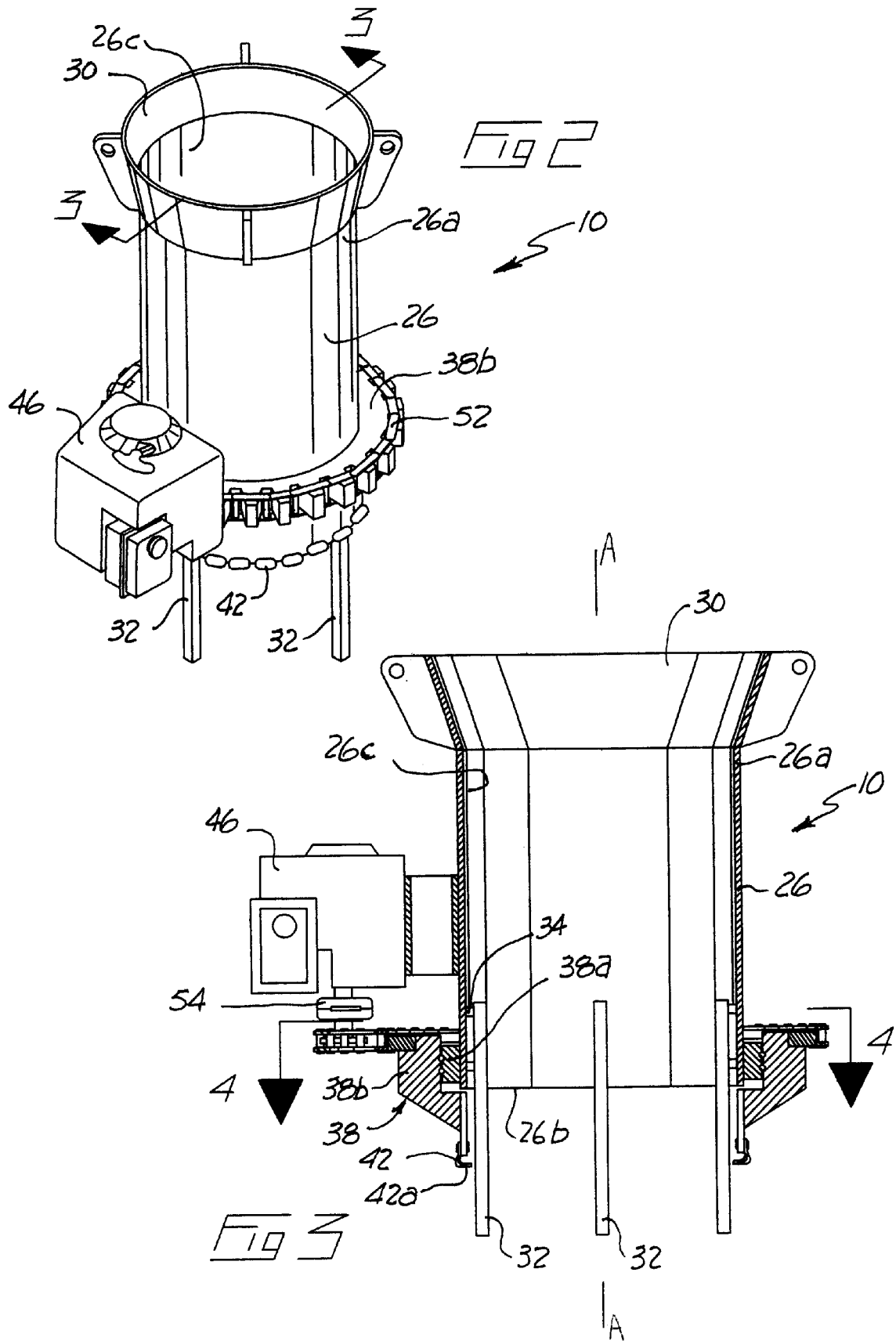

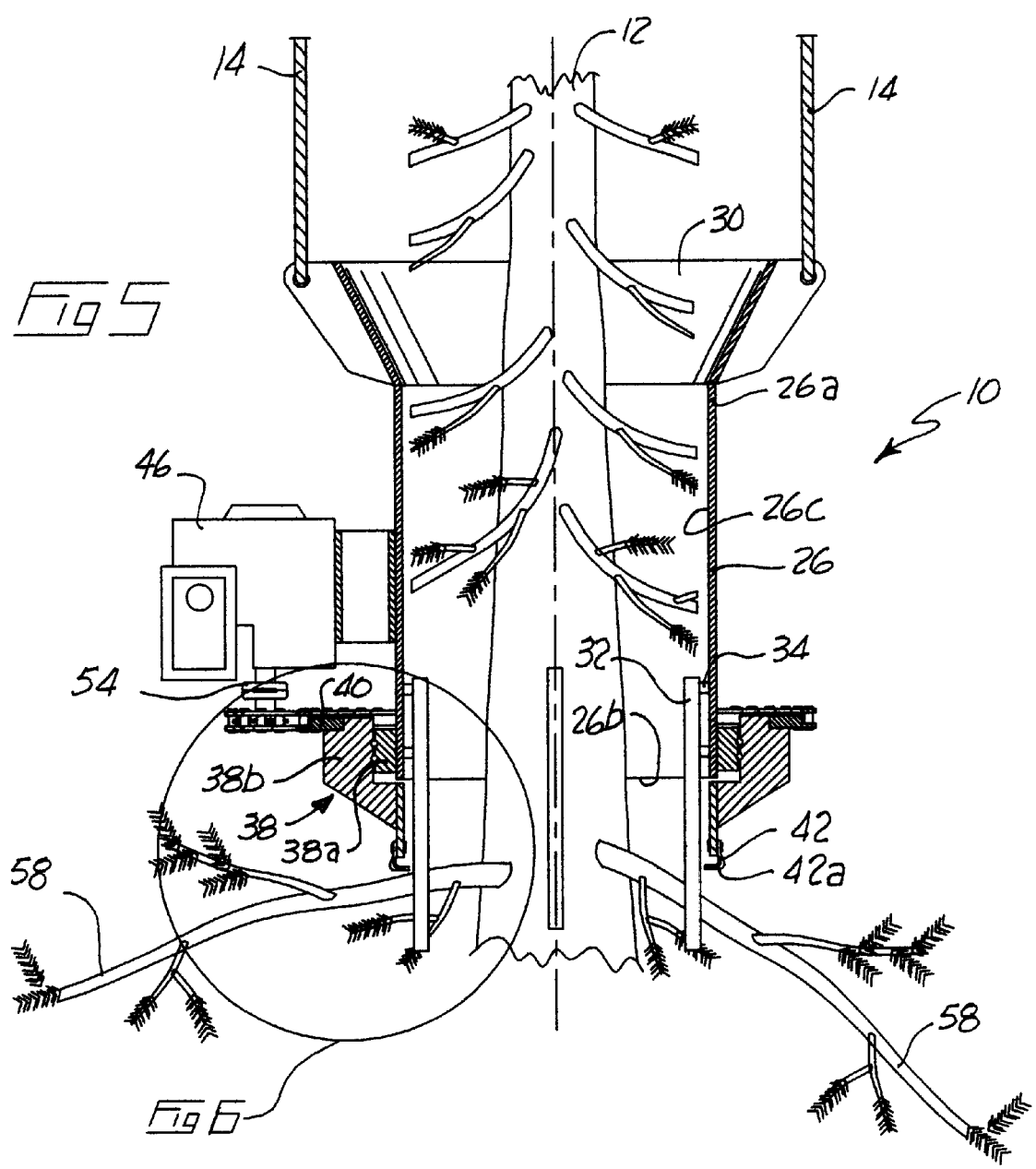

AERIAL TREE DELIMBING APPARATUS

CROSS REFERENCE TO RELATED APPLICATION

This application claims priority from Canadian Patent Application No. 2,408,958 filed Oct. 18, 2002 and from U.S. Provisional Patent Application No. 60/359,877 filed Feb. 28, 2002 entitled Aerial Tree Delimbing Apparatus.

FIELD OF THE INVENTION

This invention relates to an apparatus for delimbing top portions of standing trees, primarily coniferous, where such apparatus is suspended above a tree to be partially delimbed, by a helicopter, crane or similar equipment and lowered so that the uppermost branches are sawn off close to the trunk of the tree.

BACKGROUND OF THE INVENTION

It is often desirable to harvest a single tree amongst a stand of trees, without having to fall and delimb the tree once fallen. For example, single trees may be culled by helicopter harvesting techniques which do not disturb the surrounding trees. This requires delimbing of the tree while it stands.

Another example of the utility of the present invention involves standing trees left adjacent to the periphery of logged off areas or at the perimeter of riparian zones or leave-strips. Such trees are subject to wind turbulence and snow loading, which results in many trees falling over or becoming hazardous, so-called snags.

By reducing the catchment area of individual trees, that is the branch area near the crown which catches wind or snow, the effect of wind and snow loading on the exposed trees may be reduced. This, in turn, reduces the adverse effect such forces have on the stability of these trees. The reduction in tree catchment area can be accomplished by hand delimbing but this is neither time nor cost effective.

It is an object of the present invention to provide a delimbing apparatus containing a rotatable annular saw, which may be suspended, from a helicopter, crane or other like lifting devices, so as to be positioned over the crown of a tree, and lowered in a controlled manner to efficiently delimb the upper portion of the tree.

In the prior art applicant is aware of U.S. Pat. No. 6,263,932 which issued Jul. 24, 2001, for the Aerial Tree Harvesting Apparatus of Chalifoux. Chalifoux discloses the use of tree delimbing saws in a second body suspended from a first body, the first and second bodies having coaxial bores for mounting over a tree. The tree is delimbed as the second body is lowered over the tree. Arms are provided for clamping and holding the tree.

SUMMARY OF THE INVENTION

The aerial tree delimbing apparatus of the present invention has in one embodiment a tubular body having an upwardly and radially outwardly flared collar at an upper first end and branch engaging rods projecting downwardly from an opposite second end. The delimbing apparatus is suspended by suspension cables connected at one end of the cables to the swivel of a sling or lanyard, or other suitable equipment for slinging under a helicopter for example. The other ends of the cables are connected to the flared collar of the body of the delimber. The swivel is advantageously of the type which will conduct an electrical current or allow or provide for conduction of electricity from the helicopter to the delimber, although other means for supplying power may be provided. The suspension cables may be spaced apart by a spreader disk for example located in general proximity to the swivel.

A saw drive sprocket surrounds the tubular body near the second end of the body. It is rotatably mounted to the body by an annular bearing having an inner and an outer bearing race. The inner bearing race is fixedly secured to the tubular body of the delimber, while the outer race and the annular sprocket is freely rotatable therearound. An annular saw is secured to the outer bearing race so as to be cooperatively rotatable with both the outer bearing and the sprocket. The sprocket and annular saw are simultaneously rotated by a motor mounted to the tubular body of the delimber. The motor selectively drives a sprocket and chain. Rotation of the sprocket and chain drives the annular saw through a centrifugal clutch. The throttle of the motor is operated by an electric solenoid, which is remotely actuable by the operator of the helicopter or other lifting equipment.

In operation the solenoid is actuated so as to start the motor. The clutch engages so as to commence the saw rotating. Saw rotation increases to an operational speed. The delimber is suspended over the crown of a tree. As the delimber is lowered, the outwardly projecting branch engaging rods engage tree branches in the crown maintaining the delimber stationary relative to the tree while the annular saw cuts through the branches.

Since the diameter of the annular saw is less than the diameter of the outermost perimeter of the flared collar at the first end of the tubular body, the collar acts as a funnel so that delimber may be easily lifted upwardly and removed from the tree without catching on the remaining stubs of the sawn branches.

In summary, the tree delimber of the present invention includes a hollow tube having opposite upper and lower ends. The upper end is adapted for mounting below an aerial hoist, for example at the end of a helicopter borne sling. The lower end has an anti-rotation means or device such as a branch coupler mounted thereto, for example, a plurality of downwardly extending rigid members. The anti-rotation means is for coupling with, mating into or temporarily entangling with the branches of a tree as the trunk of the tree is journalled through the hollow tube as the tube is lowered onto the tree and down the trunk. The anti-rotation means inhibits rotation of the tube about the axis of symmetry of the tube, which is generally co-axial with the trunk of the tree.

A collar is rotatably mounted to the lower end of the tube. An annular saw blade is mounted to the collar so as to dispose a cutting edge or saw blade teeth of the saw downwardly. The cutting edge or teeth of the saw rotate in a circle contained in a plane generally perpendicular to the axis of symmetry of the tube.

A prime mover is mounted to the tube. The prime mover is remotely actuable by an operator. The prime mover cooperates with the collar so that, once actuated, the prime mover urges the collar to rotate about the axis of symmetry of the tube while the tube is held substantially stationary relative to the trunk by the anti-rotation device engaging the tree branches.

An upwardly diverging funnel may be rigidly mounted to the upper end of the tube.

BRIEF DESCRIPTION OF THE DRAWINGS

FIG. 2 is an enlarged perspective view of the present invention.

FIG. 3 is a sectional view taken along line 3—3 of FIG. 2.

FIG. 5 is an enlarged sectional view of the delimber partially lowered over the crown of a tree.

DETAILED DESCRIPTION OF EMBODIMENTS OF THE INVENTION

Figure 1:
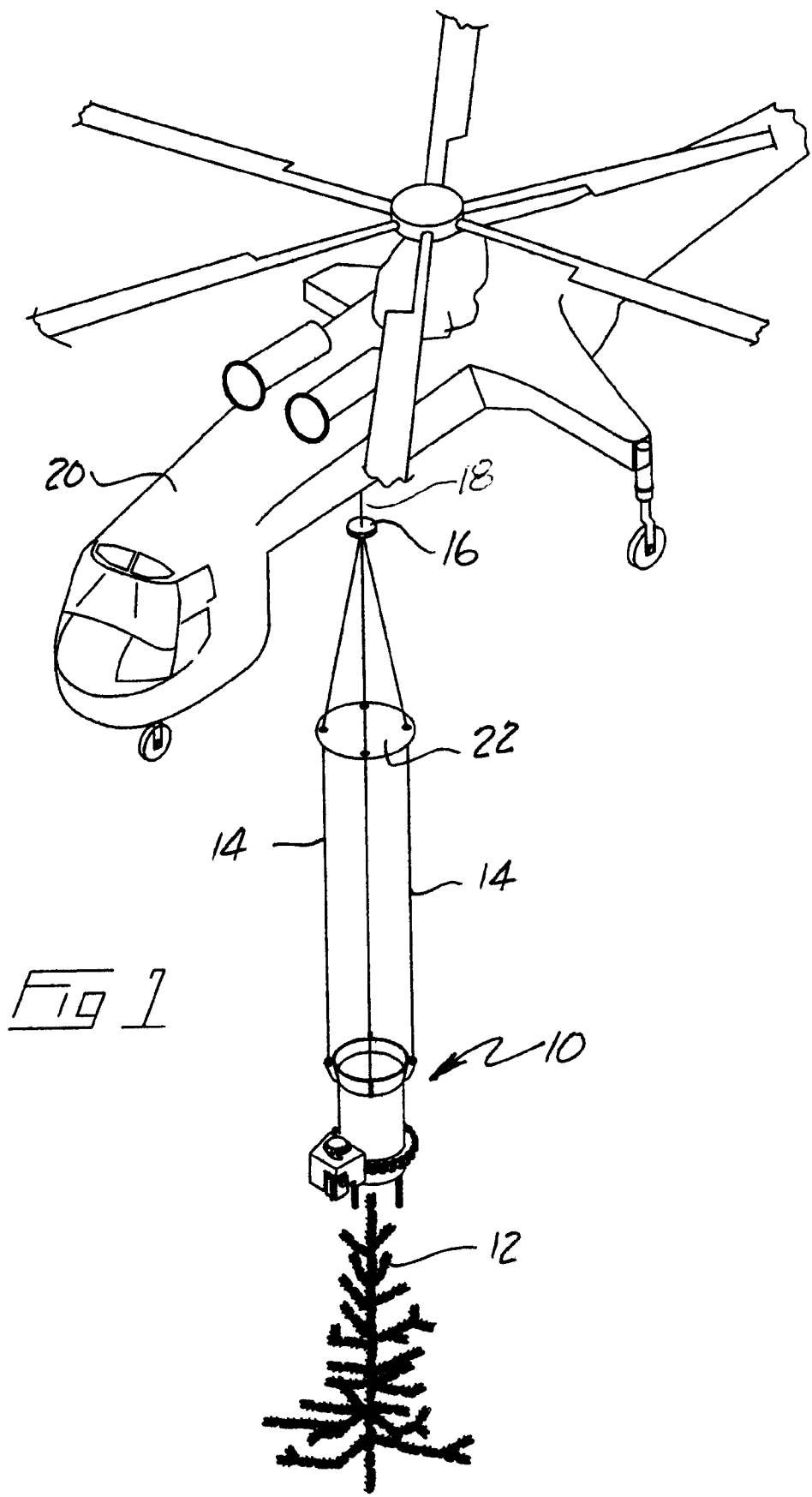
FIG. 1, is a perspective view of the delimber of the present invention suspended from a helicopter over a tree crown to be trimmed.
Figure 4:
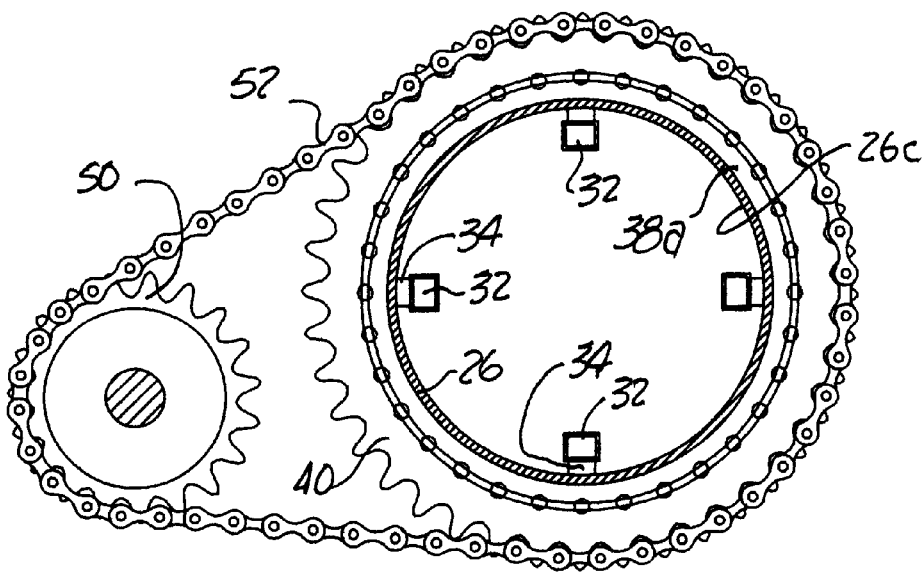
FIG. 4 is a sectional view taken along line 4—4 of FIG. 3.
Figure 6:
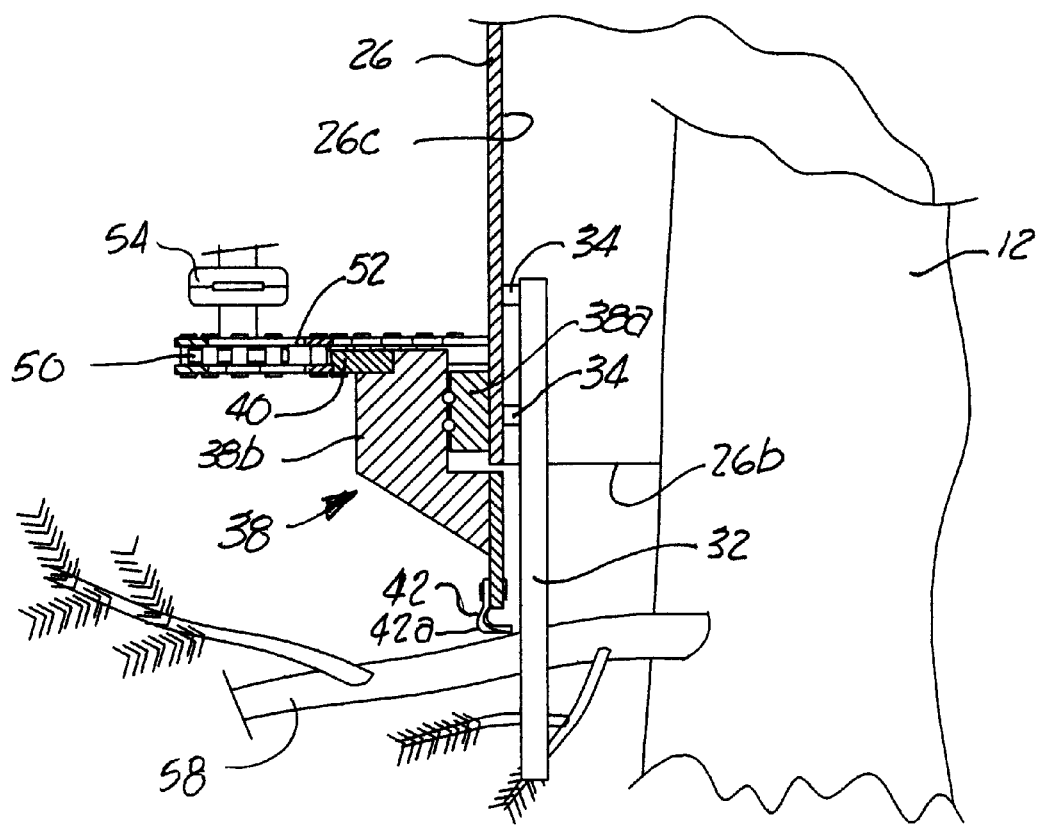
FIG. 6 is an enlarged sectional view of a portion of FIG. 5.

With reference to the drawing figures, wherein similar characters of reference denote corresponding parts in each view, FIG. 1 illustrates the tree delimbing apparatus of the present invention, hereinafter delimber 10, being lowered over the crown of a tree 12 to be trimmed. Cables 14 are attached to swivel 16' of the lanyard or sling 18 of a helicopter 20 or other lifting equipment. Swivel 16 is of the type which will conduct an electrical current from helicopter 20 to the delimber 10. Cables 14 are kept in a radially spaced apart relationship relative to the longitudinal axis of symmetry A of the tubular or cylindrical body of the delimber by a spreader 22.

Delimber 10 has a tubular or cylindrical body 26. Body 26 has open first and second ends 26a and 26b respectively. In operation the first end is the upper end. An upwardly and radially outwardly flared collar 30 mounted to first end 26a. Branch engaging rods 32 project downwardly from second end 26b. Rods 32 are spaced slightly radially inwardly from inner surface 26c of body 26 by spacing blocks 34.

An annular bearing 38 surrounds tubular body 26, near second end 26b. Bearing 38 has inner and outer bearing races 38a and 38b respectively. Inner bearing race 38a is fixedly secured or mounted to tubular body 26. Outer race 38b is freely rotatable on inner race 38, and lies in a plane perpendicular to axis A. A radially outwardly projecting annular sprocket 40 is mounted to and around race 38b. An annular saw 42 is also mounted to outer bearing race 38b and depends downwardly therefrom in proximity to the open second end 26b of body 26. Saw 42 has cutting teeth 42a which may project slightly inwardly of inner surface 26c of body 26.

A motor 46 supplies rotational power through drive sprocket 50 and chain 52 to rotationally drive sprocket 40 and saw 42 about axis A. A centrifugal clutch 54 is provided so as to cooperate between motor 46 and drive sprocket 50 ensuring operation of motor 46 without stalling. The throttle (not illustrated) of motor 46 may be actuated by a solenoid, the electrical power for which may be remotely controlled by the operator of helicopter 20.

Motor 46 may be running at an idle when delimber 10 is lowered over the crown of tree 12. Centrifugal clutch 54 is disengaged so that no rotational power is transmitted to drive sprocket 50. As apparatus 10 is further lowered, rods 32 engage branches 58 of tree 12. Once the throttle of motor 46 is opened by remote actuation from the helicopter 20 and clutch 54 engages, rotational power is transmitted through centrifugal clutch 54 to drive sprocket 50 and saw 42. Saw 42 saws through branches 58 and descend, under gravity, until more branches are encountered and subsequently cut.

The outwardly flared collar 30 secured to the first end 26a, prevents snagging of body 26 on the stubs of cut branches 58 as it is elevated on tree 12, thus simplifying removal of delimber 10 from tree 12.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An aerial tree delimbing apparatus comprising:

a tubular body having an upper first end and an opposite second end, branch engaging rods mounted to said second end so as to project downwardly from said second end, said tubular body adapted with suspension mounts at said first end for suspension by cables slung under a helicopter, a motor mounted to said body, means to provide power to said motor extending from said motor for providing power from helicopter to said motor, an annular saw drive sprocket rotatably mounted to said body so as to surround said body adjacent said second end, said drive sprocket rotatably mounted to said body by an annular bearing having an inner and an outer bearing race, wherein said inner bearing race is fixedly mounted to said body adjacent said second end, and wherein said outer bearing race and said drive sprocket are freely rotatable around said inner bearing race, an annular saw mounted to said outer bearing race downwardly disposed therefrom and so as to be simultaneously cooperatively rotatable with both said outer bearing race and said drive sprocket, said motor drivably engaged with said drive sprocket by drive means whereby said drive sprocket and said annular saw are simultaneously rotated by actuation of said motor.

2. The apparatus of claim 1 wherein said drive means is a chain and wherein said motor selectively drives a motor mounted sprocket and said chain.

3. The apparatus of claim 2 wherein a clutch is disposed on an axle between said motor and said motor mounted sprocket and rotation of said sprocket and chain drives said annular saw through said clutch.

4. The apparatus of claim 3 wherein said motor has a throttle operated by an electric solenoid, and wherein said throttle is remotely actuable.

5. The apparatus of claim 1 wherein said body has mounted thereto, at said first end, an upwardly and radially outwardly flared collar.

6. The apparatus of claim 2 further comprising a spreader disk wherein said suspension cables may be spaced apart by said spreader disk, a swivel mounted between said cables and the helicopter, said disk mounted in proximity to said swivel.

7. The apparatus of claim 5 wherein a diameter of said annular saw is less than a corresponding diameter of an outermost perimeter of said flared collar at said first end of said tubular body, whereby said collar acts as a funnel so that said body may be lifted upwardly and removed from a tree without catching on the remaining stubs of sawn branches.

8. A tree delimber comprising a hollow tube having opposite upper and lower ends, said upper end adapted for mounted below an aerial hoist, said lower end having an anti-rotation means mounted thereto for coupling with, mating into and temporarily entangling with the branches of a tree as the trunk of the tree is journalled upwardly through the hollow tube as the tube is lowered onto the tree and down the trunk of the tree, wherein said means inhibits rotation of said tube about a longitudinal axis of symmetry of said tube, wherein a collar is rotatably mounted to said lower end of said tube, and an annular saw blade having a lower cutting edge is mounted to said collar so as to dispose said cutting edge downwardly, and wherein said cutting edge of said saw rotates in a circle contained in a plane generally perpendicular to the axis of symmetry of the tube, a prime mover mounted to said tube, said prime mover remotely actuable by an operator and cooperating with said collar so that, once actuated, said prime mover urges said collar to rotate about said axis of symmetry of said tube while said tube is held substantially stationary relative to the trunk of a tree by said anti-rotation means engaging the branches of the tree.

9. The tree delimber of claim 8 further comprising an upwardly diverging funnel rigidly mounted to said upper end of said tube.

10. The tree delimber of claim 8 wherein said anti-rotation means is a branch coupler comprising a plurality of downwardly extending rigid members.

11. The tree delimber of claim 10 wherein said rigid members are an array of members radially spaced around, and parallel with, said axis of symmetry.

12. The tree delimber of claim 8 wherein said prime mover is a motor.

13. The tree delimber of claim 12 wherein said motor is an electrical motor powered via an electrical conductor extending from the aerial hoist to said motor.

14. The tree delimber of claim 13 wherein said motor has a drive shaft extending therefrom parallel to said axis of symmetry, a first drive coupler mounted on a distal end of said drive shaft, said first drive coupler drivingly engaging a second drive coupler mounted to said collar wherein rotation of said drive shaft rotates said collar about said axis of symmetry relative to said tube.

15. The tree delimber of claim 14 wherein said first drive coupler is a drive sprocket, and wherein said second drive coupler is an annular sprocket mounted around said tube orthogonally to said axis of symmetry, an endless chain mounted around said drive and annular sprockets for simultaneous rotation thereof.

16. The tree delimber of claim 8 wherein said cutting edge comprises an annular array of cutting teeth mounted around said cutting edge.

* * * * *